(12) United States Patent
Chan et al.

(10) Patent No.: US 8,310,748 B2
(45) Date of Patent: Nov. 13, 2012

(54) DISPLAY DEVICE

(75) Inventors: Chih-Cheng Chan, Hsin-Chu (TW); Chia-Tien Peng, Hsin-Chu (TW); Ho-Chien Wu, Hsin-Chu (TW); Wei-Chia Fang, Hsin-Chu (TW); Sheng-Wen Huang, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 39 days.

(21) Appl. No.: 12/972,556

(22) Filed: Dec. 20, 2010

(65) Prior Publication Data
US 2011/0286077 A1    Nov. 24, 2011

(30) Foreign Application Priority Data
May 21, 2010   (TW) ................. 99116284 A

(51) Int. Cl.
*G02B 26/00*   (2006.01)
(52) U.S. Cl. ...................................... 359/296
(58) Field of Classification Search ............ 359/296
See application file for complete search history.

(56) References Cited

U.S. PATENT DOCUMENTS

| | | | |
|---|---|---|---|
| 6,885,146 B2 * | 4/2005 | Yamazaki et al. ........... | 313/498 |
| 7,075,703 B2 | 7/2006 | O'Neil | |
| 7,236,292 B2 | 6/2007 | LeCain | |
| 7,279,709 B2 | 10/2007 | Lan | |
| 2006/0291034 A1 | 12/2006 | Patry | |
| 2007/0152956 A1 | 7/2007 | Danner | |
| 2007/0211002 A1 | 9/2007 | Zehner | |
| 2009/0225064 A1 | 9/2009 | Sah | |

FOREIGN PATENT DOCUMENTS

| | | |
|---|---|---|
| CN | 101533195 A | 9/2009 |
| CN | 101609240 A | 12/2009 |
| JP | 10177178 | 6/1998 |
| JP | 2005179657 | 7/2005 |
| JP | 2007262253 | 10/2007 |
| TW | 200712617 | 4/2007 |

* cited by examiner

*Primary Examiner* — James Jones
(74) *Attorney, Agent, or Firm* — Winston Hsu; Scott Margo

(57) ABSTRACT

A display device includes a display panel, a barrier layer, and a sealant. The display panel includes a backplane and a frontplane disposed on the backplane, wherein the frontplane includes a plurality of frontplane sidewalls. The frontplane sidewalls at least include a first frontplane sidewall and a second frontplane sidewall, forming a frontplane concavity. The barrier layer includes a first barrier layer sidewall and a second barrier layer sidewall, wherein the first barrier layer sidewall and the second barrier layer sidewall form a barrier layer concavity. The barrier layer concavity corresponds to the frontplane concavity, and at least one of the barrier layer concavity and the frontplane concavity does not include a right angle. The sealant is disposed in a sealant accommodating space defined by the frontplane sidewalls of the frontplane, an inner surface of the backplane and an inner surface of the barrier layer.

20 Claims, 13 Drawing Sheets

DISPLAY DEVICE

BACKGROUND OF THE INVENTION

1. Field of the Invention

The present invention relates generally to a display device, and more specifically, to a display device capable of reducing bubbles in sealants.

2. Description of the Prior Art

Reading words or pictures printed on paper is the most accepted reading method for human beings. As paper printing techniques have advanced and printing costs have lowered, paper has been extensively used as a data storage medium. However, as display techniques advance, it is possible that in the near future, paper may be replaced by various types of display device, particularly an electrophoretic display (EPD). Like paper, the electrophoretic display is thin in profile, small in size, lightweight, easy to carry, and flexible. Therefore, it is expected that the electrophoretic display can be applied in electronic paper or electronic books, replacing conventional paper and books.

Refer to FIG. 1 and FIG. 2. FIG. 1 and FIG. 2 schematically depict a conventional electrophoretic display device, wherein FIG. 1 is a cross-sectional view taken along line A-A' of FIG. 2. The conventional electrophoretic display device 100 comprises a backplane 102, a frontplane 104, and an electronic ink material layer 106 located between the backplane 102 and the frontplane 104. Since the optical properties of the electronic ink material layer 106 are prone to be affected by water vapor, the electrophoretic display device 100 usually further comprises a barrier layer 108 formed on the frontplane 104, and a sealant 110 formed on the periphery of the frontplane 104, the backplane 102 and the barrier layer 108 in a packaging process to avoid wafer vapor from invading the electronic ink material layer 106. For purposes of clear illustration of each element, the sealant 110 is not shown in FIG. 2.

As shown in FIG. 1 and FIG. 2, in order to transfer the common voltage ($V_{com}$) from the backplane 102 to the common electrode (not shown) of the frontplane 104, the electrophoretic display device 100 in the prior art also has a silver gel disposed on a frontplane ear 112 protruding from the frontplane 104, and the barrier layer 108 may usually have a corresponding barrier layer ear 113. However, due to poor design of the frontplane ear 112 and the barrier layer ear 113, bubbles tend to appear in the sealant 110 formed in the packaging process, which will result in defects. Refer to FIG. 3, which is a partial enlarged diagram of an area B in FIG. 2. As shown in FIG. 3, due to the right-angle design of the frontplane ear 112 and the barrier layer ear 113, the distance between a turning point of the frontplane ear 112 and the barrier layer ear 113 may be different or too large compared with the distance between other positions of the frontplane ear 112 and the barrier layer ear 113. For example, the distance d1 between the corners of the turning points is larger than the distance d2 between the two parallel surfaces. Under these conditions, the sealant 110 can only spread inward from the edge of the barrier layer 108 through the distance d2, but can not reach the distance d1. Thus, the sealant 110 cannot fill the turning point. As a result, bubbles 116 will be formed at the turning point after curing the sealant 110. The bubbles 116 not only reduce water-proofing capability of products, giving rise to lower reliability of products, but also form holes in the sealant 110, which tend to burst during thermal curing.

SUMMARY OF THE INVENTION

This invention provides a display device for solving the bubble problem in the sealant due to the poor ear design.

According to a preferred embodiment of the present invention, a display device comprises a display panel, a barrier layer and a sealant. The display panel comprises a backplane and a frontplane disposed on the backplane. The frontplane comprises a plurality of frontplane sidewalls, the frontplane sidewalls at least include a first frontplane sidewall and a second frontplane sidewall, and the first frontplane sidewall and the second frontplane sidewall form a frontplane concavity. The barrier layer has a first barrier layer sidewall and a second barrier layer sidewall, which form a barrier layer concavity. The barrier layer concavity corresponds to the frontplane concavity, and at least one of the barrier layer concavity and the frontplane concavity does not include a right angle. The sealant is disposed in a sealant accommodating space defined by the frontplane sidewalls of the frontplane, an inner surface of the barrier layer and an inner surface of the backplane.

According to another preferred embodiment of the present invention, a display device comprises a display panel, wherein the display panel comprises a backplane and a frontplane disposed on the backplane. The frontplane has a plurality of frontplane sidewalls, and the frontplane sidewalls at least include a first frontplane sidewall and a second frontplane sidewall to form a frontplane concavity. The angle of a turning point of the frontplane concavity is between about 135° and about 180°.

According to still another preferred embodiment of the present invention, a display device comprises a display panel and a barrier layer. The display panel has a plurality of sidewalls at least including a first sidewall and a second sidewall, wherein the first sidewall and the second sidewall form a display panel concavity. The barrier layer is located on the display panel and the barrier layer has a first barrier layer sidewall and a second barrier layer sidewall forming a barrier layer concavity corresponding to the display panel concavity. One of the display panel concavity and the barrier layer concavity does not include a right angle.

In the present invention, the display devices of different embodiments propose different designs of the structure of the frontplane concavity and the barrier layer concavity to solve the problem of bubbles formed in sealants due to the distance difference in the turning point. Accordingly, the water-proof of products and product yield are both improved.

These and other objectives of the present invention will no doubt become obvious to those of ordinary skill in the art after reading the following detailed description of the preferred embodiment that is illustrated in the various figures and drawings.

DETAILED DESCRIPTION

To provide a better understanding of the present invention, preferred embodiments will be described in detail. The preferred embodiments of the present invention are illustrated with reference to the accompanying figures with numbered elements.

Figure 4:
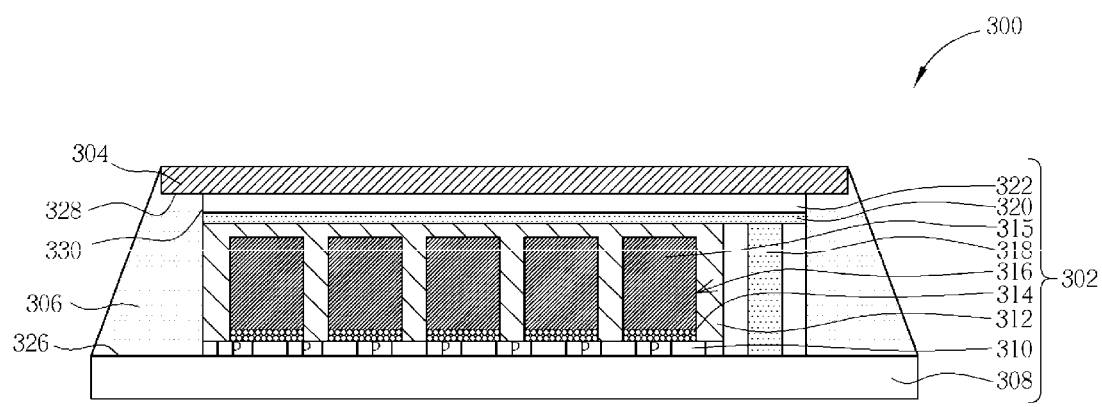
FIG. 4 schematically depicts a display device according to one embodiment of the present invention.

Refer to FIG. 4, which schematically depicts a display device according to one embodiment of the present invention. As shown in FIG. 4, the display device 300 of the present embodiment comprises a display panel 302, a barrier layer 304, and a sealant 306. The display panel 302 may be various types of display panel, such as an electroluminescent display panel or an electrophoresis display panel, but is not limited thereto. The display panel 302 comprises a backplane 308, a pixel electrode layer 310, a spacer structure 312, a plurality of charged particles 314, an electrophoresis material 315, a plurality of accommodating spaces 316, a conductive adhesive 318, a common electrode 320 and a frontplane 322. The backplane 308 is disposed substantially parallel with and opposite to the frontplane 322, wherein the area of the backplane 308 is larger than the area of the frontplane 322, but is not limited thereto. The backplane 308 and the frontplane 322 are preferably flexible soft substrates, but may also be hard substrates, such as glass substrates, quartz substrates, plastic substrates, etc. The backplane 308 in this embodiment is an active element array substrate, and the pixel electrode layer 310 is disposed thereon. The pixel electrode layer 310 has a variety of electronic elements capable of driving the charged particles 314 inside the accommodating spaces 316. For example, a plurality of pixel areas P are disposed in the pixel electrode layer 310, and scanning lines (not shown), data lines (not shown), thin film transistors (not shown), and pixel electrodes (not shown) are disposed inside the pixel electrode layer 310 and corresponding to each pixel area P. Each of the pixel areas P having the charged particles 314 can be turned on individually by driving the aforementioned scanning lines and data lines in a scanning manner, such that different images may be displayed in different pixel areas P. In addition to the aforementioned active driving method, the pixel electrode layer 310 of this invention can also comprise other non-active (passive) electronic elements, such as intersectedly arranged stripe electrodes, and the charged particles 314 can be driven by the non-active electronic elements in a passive way.

Figure 5:
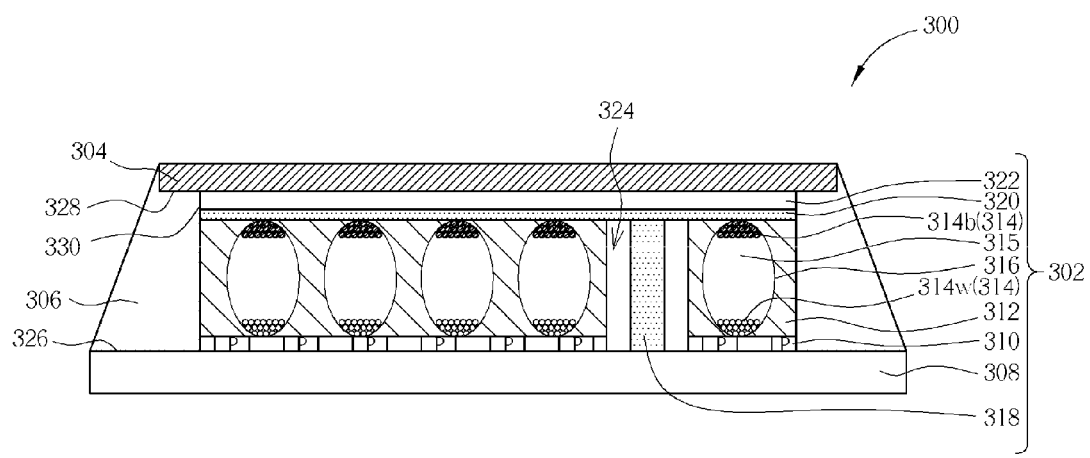
FIG. 5 schematically depicts a display device according to another embodiment of the present invention.

The spacer structure 312 is disposed on the pixel electrode layer 310, and the plurality of accommodating spaces 316 are defined by the spacer structure 312. In this embodiment, each accommodating space 316 is a cup-shaped space, but is not limited thereto. The charged particles 314 and the electrophoresis material 315 are disposed inside each accommodating space 316. In this embodiment, the charged particles 314 may be for instance white titanium oxide ($TiO_2$) particles, and the electrophoresis material 315 may be a black non-polar solution. The charged particles 314 are distributed in the electrophoresis material 315. The common electrode 320 is disposed on one side of the frontplane 322 facing the backplane 308 and is connected to a common voltage through the conductive adhesive 318. The common electrode 320 may be a transparent conductive layer, such as indium tin oxide (ITO), indium zinc oxide (IZO), aluminum zinc oxide (AZO), or indium tin zinc oxide (ITZO), but is not limited thereto. The conductive adhesive 318 may be a silver gel disposed between the spacer structure 312 and the sealant 306. In another embodiment, the conductive adhesive 318 may also be disposed at other position. Refer to FIG. 5, which schematically depicts a display device according to another embodiment of the present invention. As shown in FIG. 5, the conductive adhesive 318 may also be disposed inside the spacer structure 312. For instance, an opening (or a space) 324 is located inside the spacer structure 312. The conductive adhesive 318 is disposed inside the opening 324. In addition, each accommodating space 316 defined by the spacer structure 312 can be not only a cup-shaped space shown in FIG. 4, but also a spherical space shown in FIG. 5, a pillar space, a tapered space, or other shapes of space. Furthermore, the charged particles 314 inside each accommodating space 316 comprise black charged particles 314b and white charged particles 314w of opposite conductive types, and the charged particles 314 are suspended in the transparent electrophoresis material 315, without limitation thereto. For instance, the charged particles 314 may have other different colors, or may be a different electrophoresis material 315 having other different colors.

Refer to FIG. 4 and FIG. 5. The barrier layer 304 is disposed on the frontplane 322. For avoiding vapor invading the display device, the barrier layer 304 entirely covers or even exceeds the frontplane 322. The area of the barrier layer 304 is larger than the area of the frontplane 322, and the area of the backplane 308 is larger than the area of the barrier layer 304. The material of the barrier layer 304 may be a variety of water-proof organic materials, such as resins like Benzocyclobutane (BCB), cycloalkene, polyimide, polyamide, polyester, polyol, polyethylene oxide, polystyrene, resin, polyether, polyketide, or other inorganic materials such as silicon oxide, silicon nitride, silicon oxynitride, silicon carbide, aluminum oxide, or a composite layer composed of organic materials and inorganic materials, without limitation to the above. The sealant 306 is disposed on the periphery of the barrier layer 304 and the display panel 302. More specifically, the sealant 306 is disposed in a sealant accommodating space formed by an inner surface 326 of the backplane 308, an inner surface 328 of the barrier layer 304 and a frontplane sidewall 330 of the frontplane 322, to prevent water vapor from invading.

Figure 1:
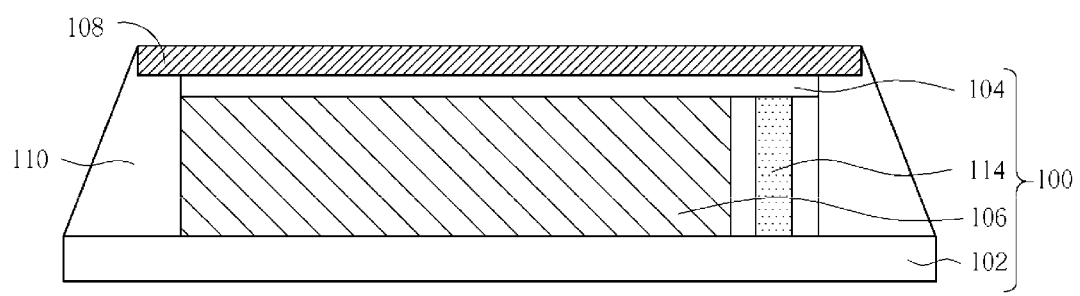
FIGS. 1-3 schematically depict a conventional electrophoretic display device.
Figure 2:
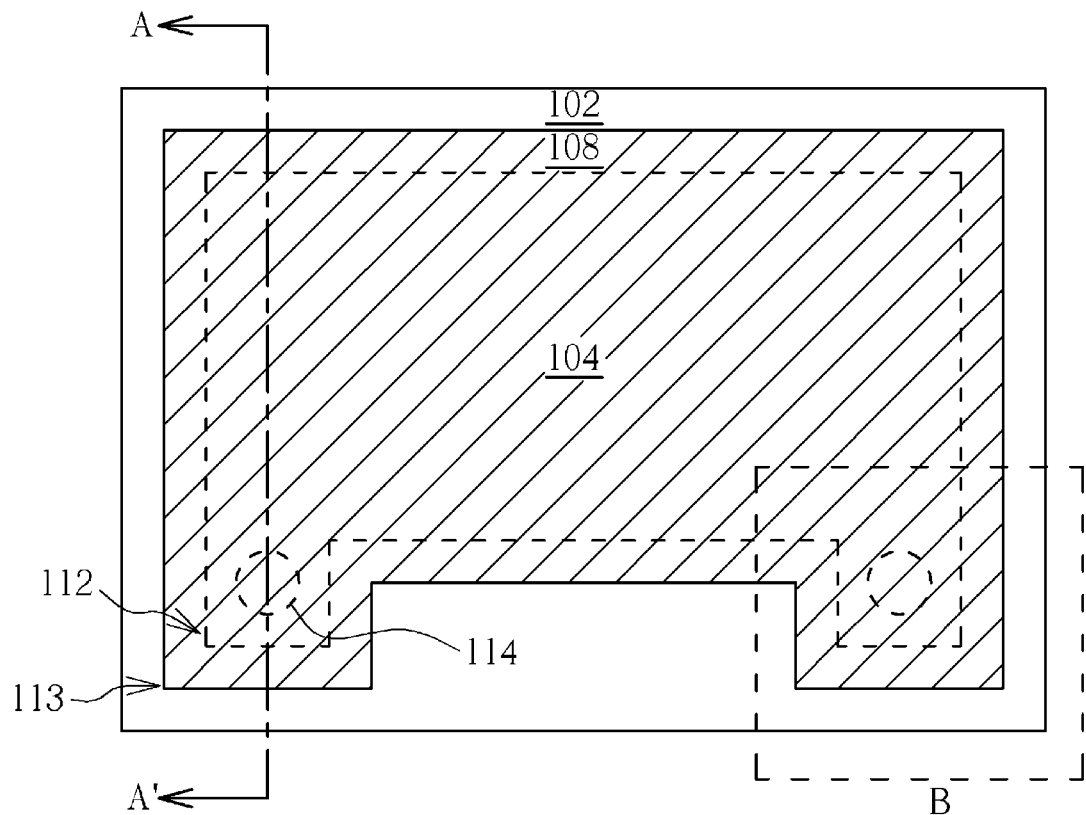
Figure 3:
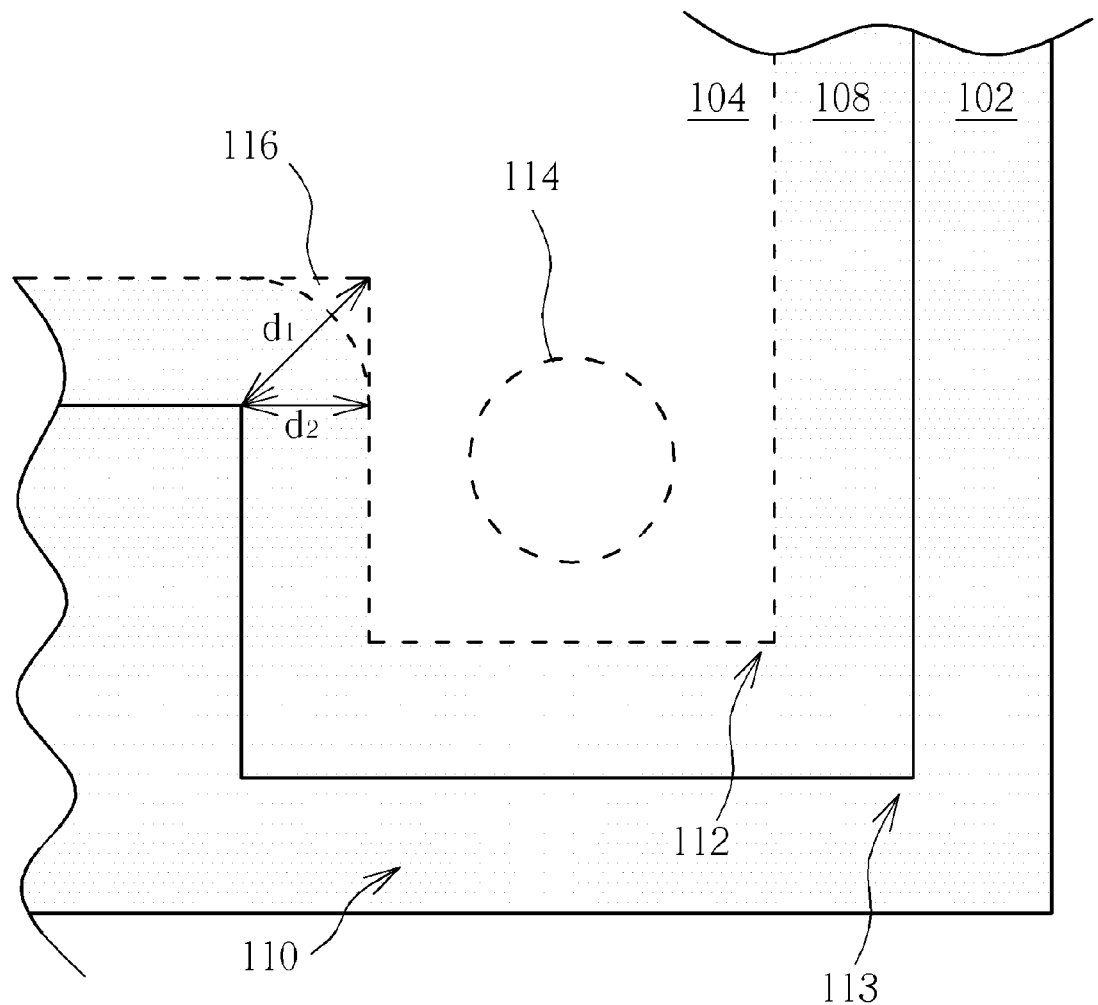
Figure 6:
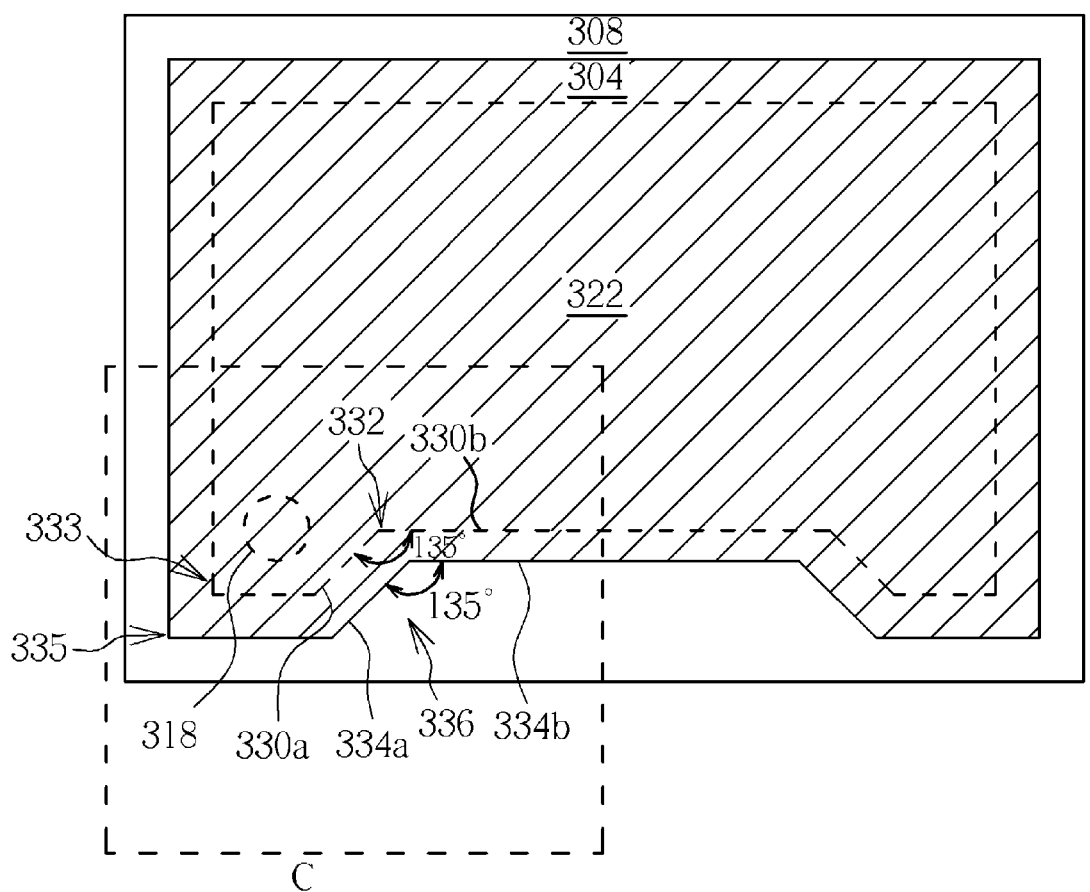
FIG. 6 and FIG. 7 schematically depict a display device according to one embodiment of the present invention.
Figure 7:
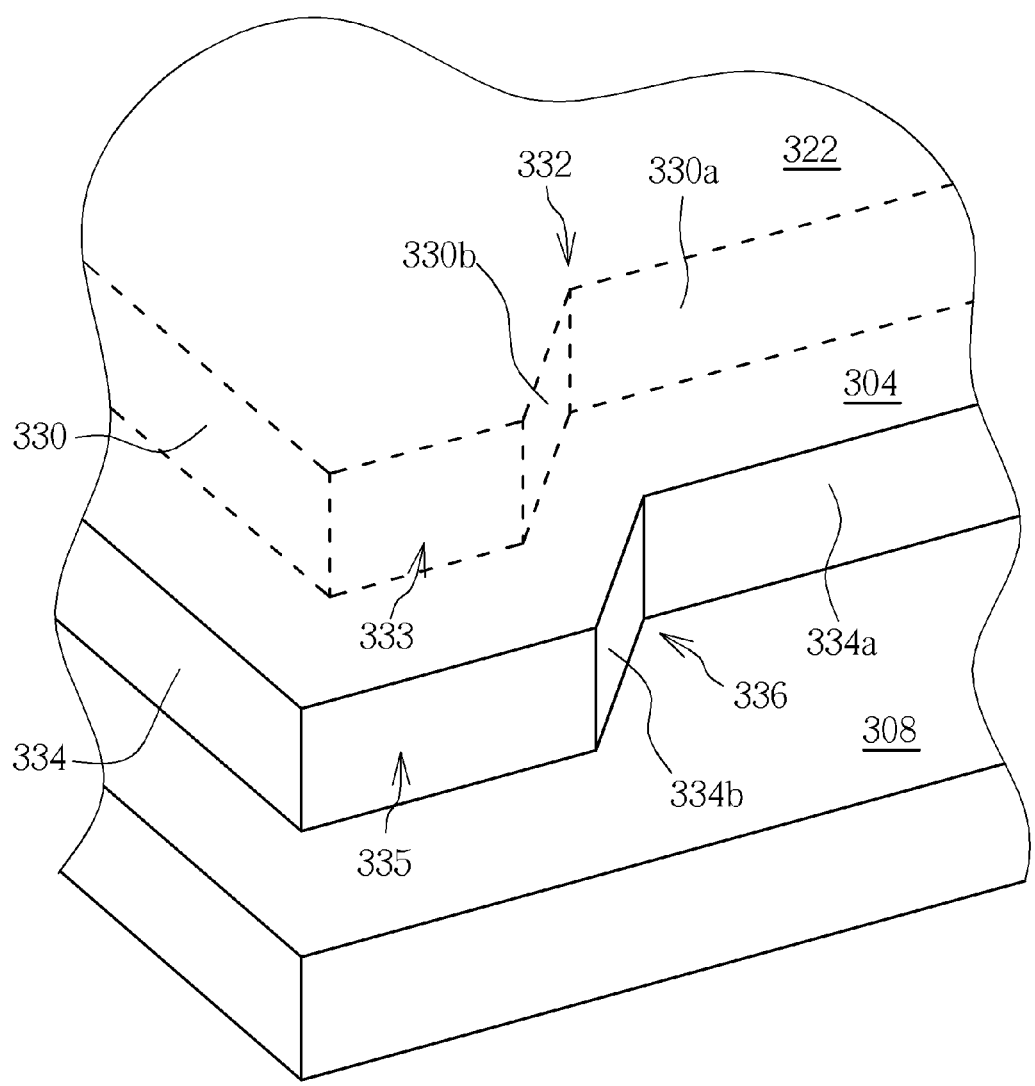

In order to prevent the problem of the prior art of the sealant 306 forming bubbles easily during formation, which results from the poor design of the turning point, this invention proposes a display device having a frontplane 322 and a barrier layer 304. Refer to FIG. 6 and FIG. 7. FIG. 6 and FIG. 7 schematically depict a display device according to one embodiment of the present invention, wherein FIG. 6 is a top view diagram, and FIG. 7 is an oblique diagram of area C in FIG. 6. For clearly illustrating the features of this embodiment, FIG. 6, FIG. 7, and the drawings of the following embodiments only show the backplane 308, the frontplane 322 and the barrier layer 304. As shown in FIG. 6 and FIG. 7, the display device comprises the backplane 308, the frontplane 322 and the barrier layer 304 from bottom to top. The barrier layer 304 is disposed on the top of the frontplane 322 and substantially entirely covers the frontplane 322. The frontplane 322 has at least a protruding frontplane ear 333, the barrier layer 304 has at least a protruding barrier layer ear 335, and the frontplane ear 333 substantially corresponds to the barrier layer ear 335. In this embodiment, the conductive adhesive 318 is disposed between the frontplane ear 333 and the backplane 308. As shown in FIG. 7, the frontplane 322 has a plurality of the frontplane sidewalls 330, and the frontplane sidewall 330 near the frontplane ear 333 at least comprises a first frontplane sidewall 330a and a second frontplane sidewall 330b. The first frontplane sidewall 330a and the second frontplane sidewall 330b form a frontplane concavity 332. The barrier layer 304 has a plurality of barrier layer sidewalls 334, and the portion of the barrier layer 304 near the barrier layer ear 335 has a first barrier layer sidewall 334a and a second barrier layer sidewall 334b. The first barrier layer sidewall 334a and the second barrier layer sidewall 334b form a barrier layer concavity 336. In a preferred embodiment, the barrier layer concavity 336 corresponds to the frontplane concavity 332. In order to avoid both the barrier layer 336 and the frontplane concavity 332 having right angles that would give rise to the distance difference being too large (d1>d2, as shown in FIG. 3), the frontplane concavity 332 and/or the barrier layer concavity 336 of this invention have specific angles or structures. For instance, the angle of the turning point of the barrier layer concavity 336 is in a range of about 135° to about 180°, and the angle of the turning point of the barrier layer concavity 336 is between about 135° and about 180°. In this embodiment, as the turning point of the frontplane concavity 332 is designed with non-right angles, for instance between about 135° and about 180°, accumulation and generation of bubbles can be avoided at the turning point of the frontplane concavity 332 in the sealant forming process, without limitation thereto. As the bottom surface of the barrier layer 304 is substantially identical to the top surface of the frontplane 322 (that is, the turning point of the barrier layer concavity 336 is designed as an non-right angle as the barrier layer 304 does not protrude from the frontplane 322, for instance between about 135° and about 180°), accumulation or generation of bubbles can be avoided at the turning point of the barrier layer concavity 336 in the sealant forming process. Moreover, the barrier layer concavity 336 is easily filled up with the sealant 306, and the sealant 306 near the turning point of the frontplane concavity 332 is obliquely affected to avoid accumulation and generation of bubbles in the turning point of the frontplane concavity 332. As shown in FIG. 6 and FIG. 7, in a preferred embodiment of the invention, both the barrier layer concavity 336 and the frontplane concavity 332 can have an angle of about 135°. The distance between the turning points can be equal through the method of modulating the angle of the turning points of the frontplane concavity 332 and the barrier layer 336, hence effectively avoiding bubbles generating in the sealant 306 during the sealant forming process and enabling the sealant 306 to distribute uniformly.

Figure 8:
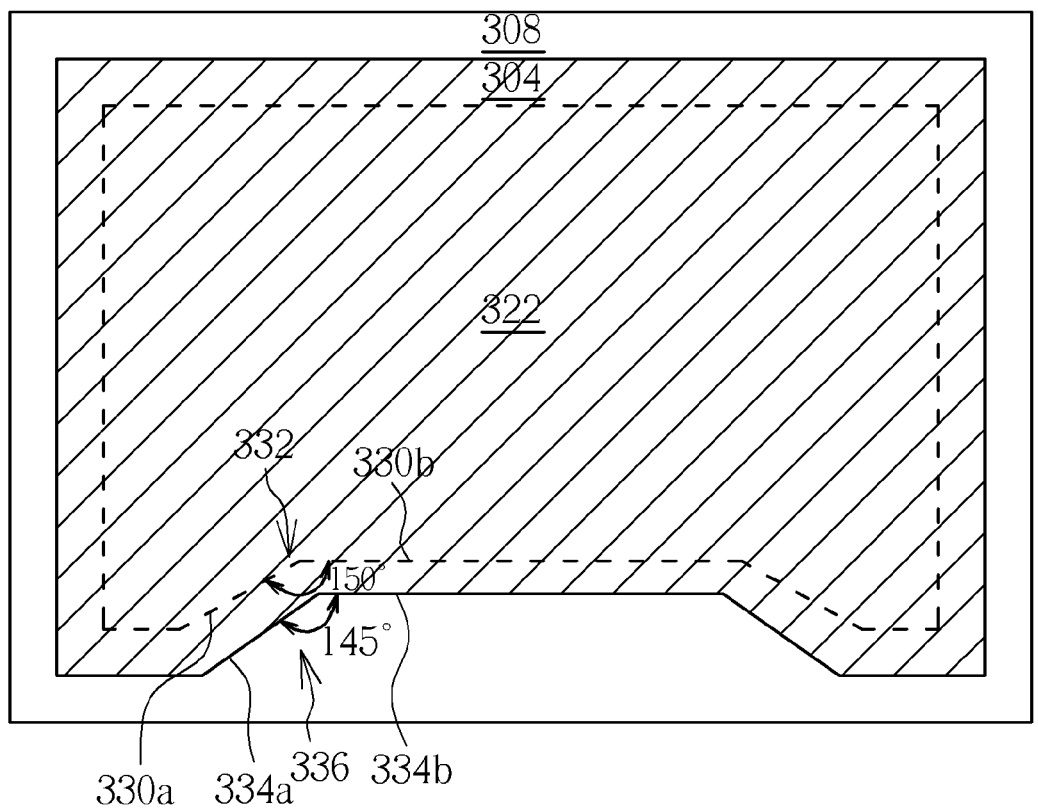
FIG. 8 schematically depicts a display device according to another embodiment of the present invention.

Refer to FIG. 8, which schematically depicts a display device according to another embodiment of the present invention. In the following embodiment, the position of the barrier layer concavity 336 and the frontplane concavity 332 are shown in a planar view, but it shall be understood by those skilled in the art that the frontplane sidewall 330, the frontplane concavity 332, the barrier layer sidewall 334 and the barrier layer concavity 336 may have the relatively stereo structure shown in FIG. 7. Referring to FIG. 8, the angles of the barrier layer concavity 336 and the frontplane concavity 332 may be different in this embodiment. For instance, the angle of the barrier layer concavity 336 may be about 145° and the angle of the frontplane concavity 332 may be about 150°.

Figure 9:
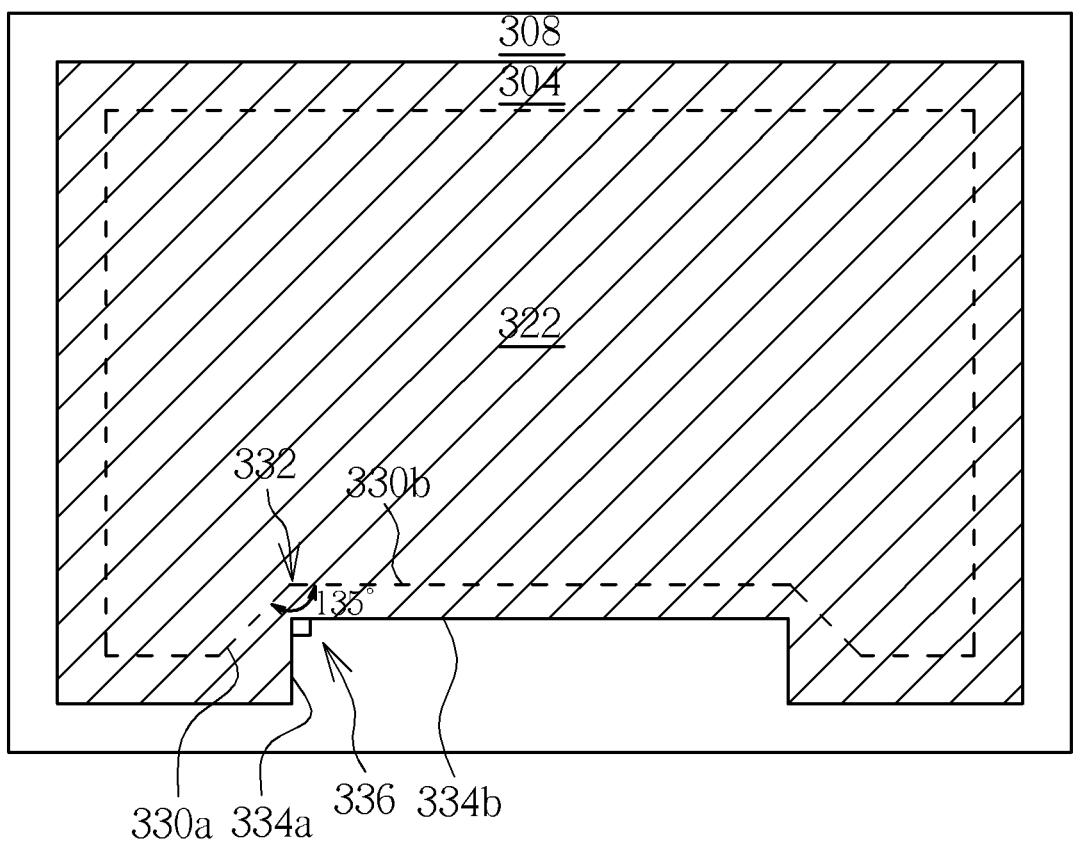
FIG. 9 schematically depicts a display device according to another embodiment of the present invention.

In another embodiment, as the angle of the frontplane concavity 332 is within the range of a specific value but is not a right angle, the angle of the barrier layer concavity 336 can be a right angle. Refer to FIG. 9, which schematically depicts a display device according to another embodiment of the present invention. As shown in FIG. 9, the angle of the frontplane concavity 332 is in the range of about 135° to about 145°, such as about 135°. The angle of the barrier layer concavity 336 is in the range of about 85° to about 95°, such as about 90°.

Figure 10:
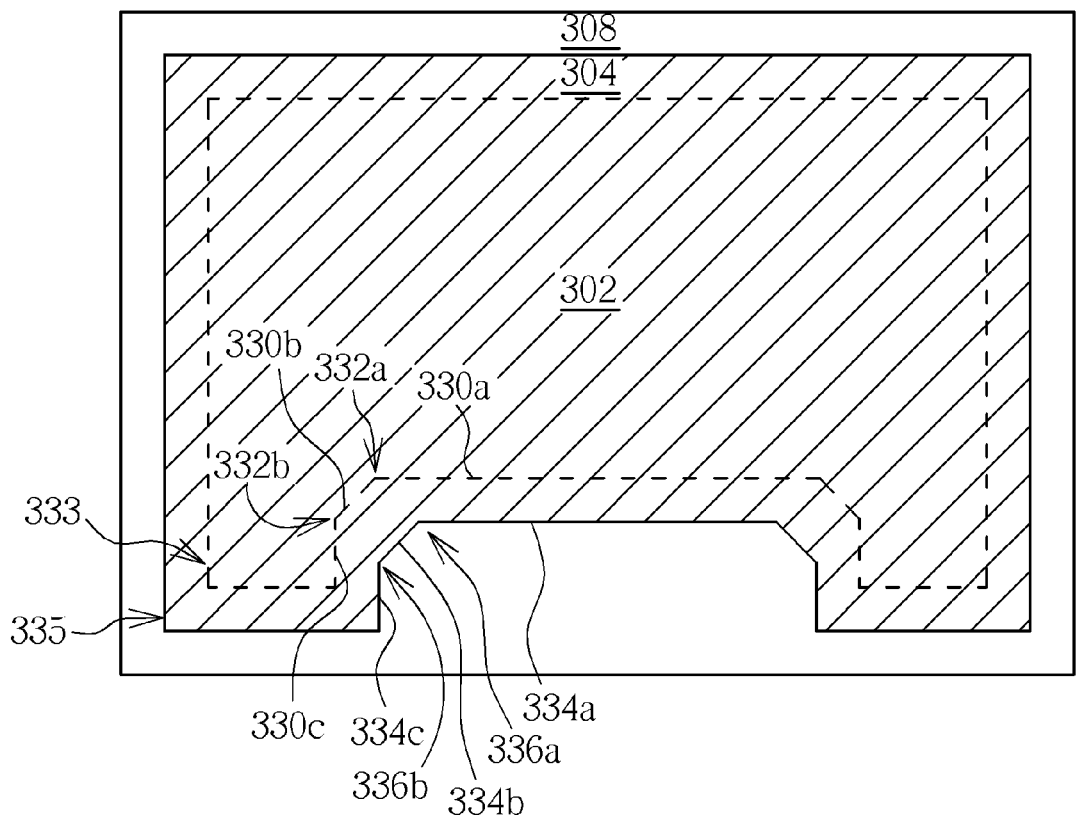
FIG. 10 schematically depicts a display device according to another embodiment of the present invention.

Refer to FIG. 10, which schematically depicts a display device according to another embodiment of the present invention. As shown in FIG. 10, the frontplane ear 333 of the frontplane 322 may correspond to more than one frontplane concavity 332. For instance, the frontplane 322 may have a first frontplane sidewall 330a, a second frontplane sidewall 330b, and a third frontplane sidewall 330c. The first frontplane sidewall 330a and the second frontplane sidewall 330b form a first frontplane concavity 332a, and the second frontplane sidewall 330b and the third frontplane sidewall 330c form a second frontplane concavity 332b. In a preferred embodiment, the first frontplane concavity 332a and the second frontplane concavity 332b have obtuse angles. The barrier layer 304 has a first barrier layer sidewall 334a, a second barrier layer sidewall 334b, and a third barrier layer sidewall 334c. The first barrier layer sidewall 334a and the second barrier layer sidewall 334b form a the first barrier layer concavity 336a, and the second barrier layer sidewall 334b and the third barrier layer sidewall 334c form a second barrier layer concavity 336b. The first barrier layer concavity 336a and the second barrier layer concavity 336b both preferably have obtuse angles. The first barrier layer concavity 336a substantially corresponds to the first frontplane concavity 332a, and the second barrier layer concavity 336b substantially corresponds to the second frontplane concavity 332b, hence reducing the distance difference between the turning points. It is worthy of note that, except for the two configurations of the frontplane concavity 332a, 332b described in the aforementioned embodiments, each frontplane ear 333 may also correspond to more than two frontplane concavities defined by a plurality of two adjacent frontplane sidewalls, and each barrier layer ear 335 may also correspond to more than two barrier layer concavities 336 defined by a plurality of two adjacent barrier layer sidewalls. In a preferred embodiment, each barrier layer concavity corresponds to each frontplane concavity.

Figure 11:
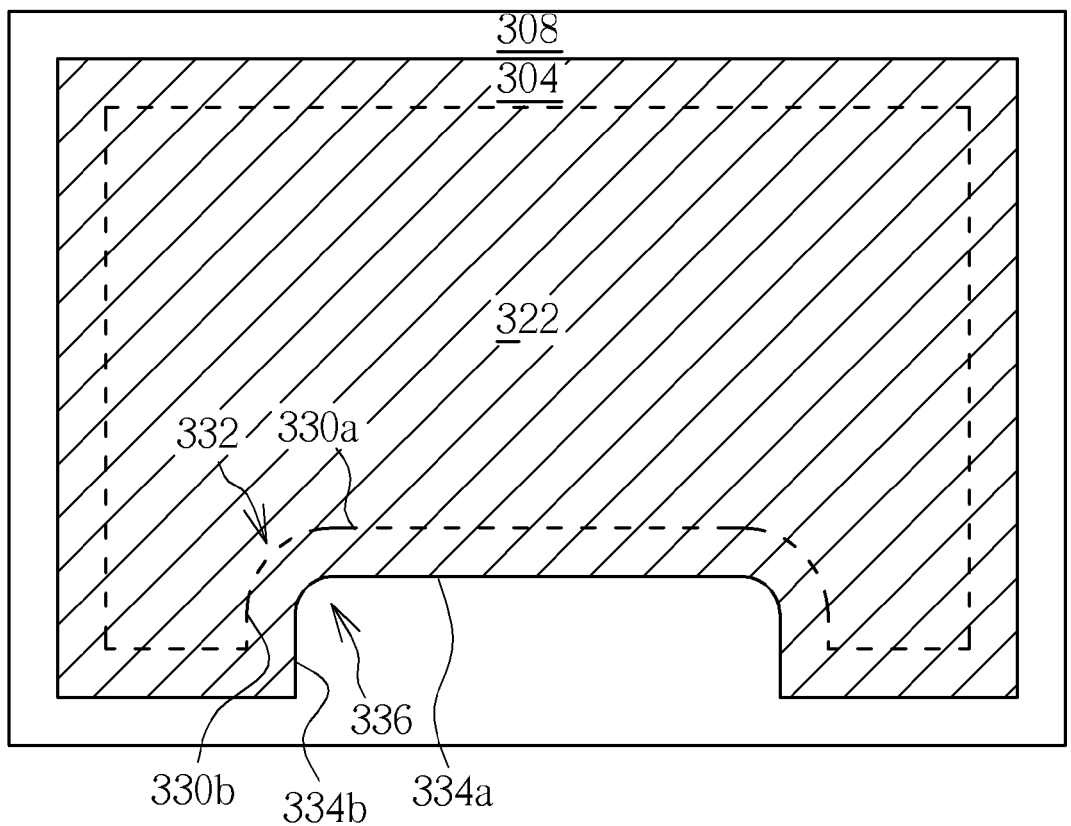
FIG. 11 schematically depicts a display device according to another embodiment of the present invention.

Refer to FIG. 11, which schematically depicts a display device according to another embodiment of the present invention. In this case, the frontplane concavity 332 has an arc-shaped structure. That is, the frontplane concavity 332 defined by the frontplane sidewall 332a and the second frontplane sidewall 332b may have a curved structure, such as a circular arc having a specific curvature radius. In this embodiment, the barrier layer concavity 336 may also have an arc-shaped structure.

It is worthy of note that a variety of configurations of the frontplane concavity 332 provided above can go with a variety of configurations of the barrier layer concavity 336 provided above according to product demands. For instance, the frontplane concavity 332 has a 135° obtuse angle (as shown in FIG. 7), while the barrier layer concavity 336 may have an arc-shaped structure (as shown in FIG. 11). Or, the frontplane ear 333 may correspond to the plurality of frontplane concavities 332 (as shown in FIG. 10), while the barrier layer concavity 336 has a right angle (as shown in FIG. 9). In all configurations, the frontplane concavity 332 and the barrier layer concavity 336 cannot both have right angles. In other words, the frontplane concavity 332 or the barrier layer concavity 336 may have a right angle, an obtuse angle, or an arc angle, but they can not both have right angles.

Figure 12:
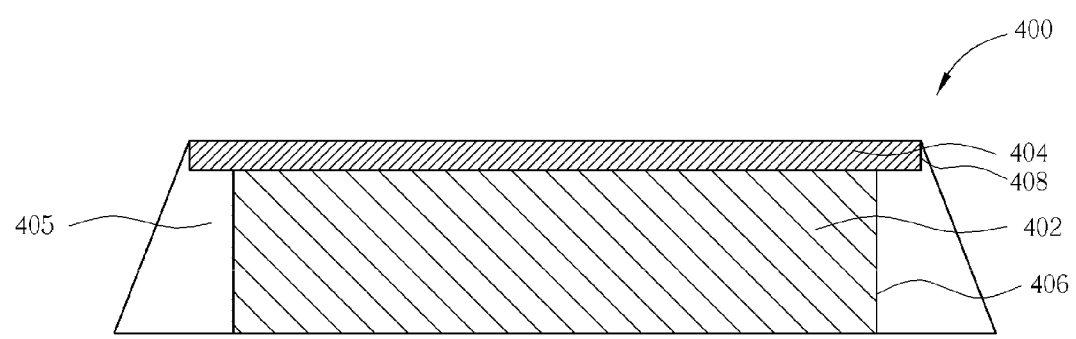
FIG. 12 and FIG. 13 schematically depict a display device according to another embodiment of the present invention.
Figure 13:
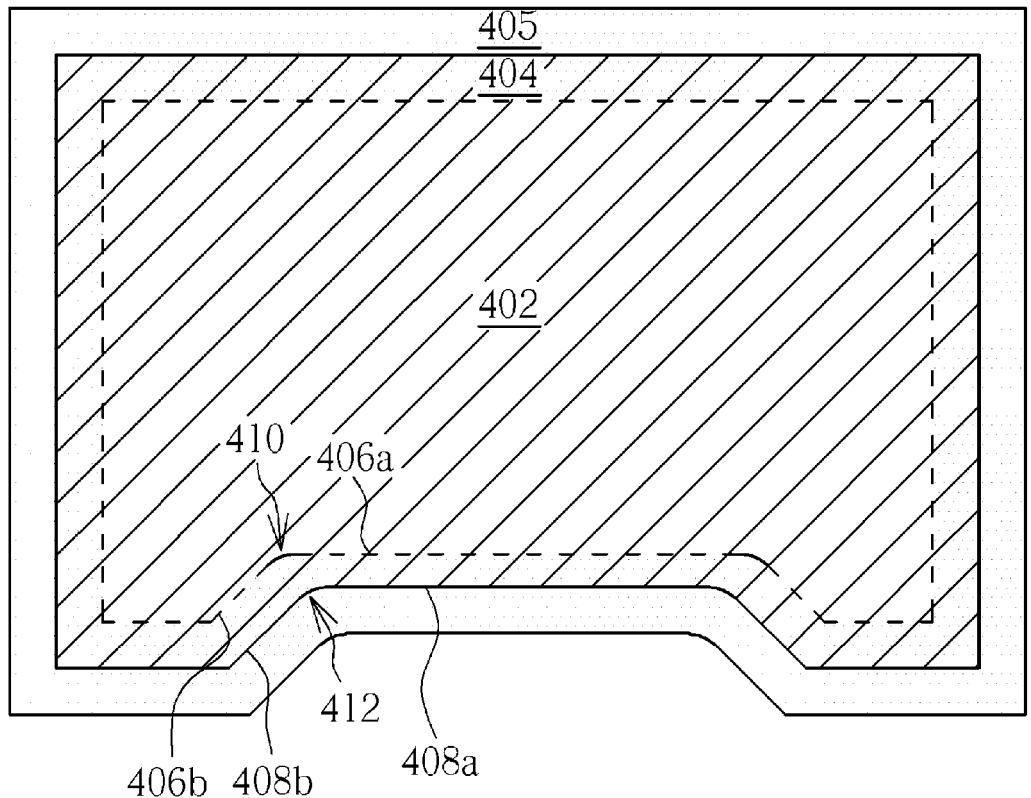

Refer to FIG. 12 and FIG. 13, which schematically depict a display device according to another embodiment of the present invention. The display device 400 comprises a display panel 402, a barrier layer 404 and a sealant 405. The display panel 402 of this embodiment is not limited to an electrophoresis display panel. Instead, the display panel 402 can also be another type of display panel, such as a liquid crystal display panel, a plasma display panel, or an electroluminescence display panel. The barrier layer 404 is disposed on the display panel 402. In a preferred case, the barrier layer 404 entirely covers or even protrudes from the display panel 402, and the area of the barrier layer 404 is larger than the area of the display panel 402. The sealant 405 is disposed surrounding the display panel 402 and the barrier layer 404, and covers a display panel sidewall 406 of the display panel and a barrier layer sidewall 408 of the barrier layer.

As shown in FIG. 13, the display panel at least comprises a first display panel sidewall 406a and a second display panel sidewall 406b. The first display panel sidewall 406a and the second display sidewall 406b form a display panel concavity 410. The barrier layer 404 at least comprises a first barrier layer sidewall 408a and a second barrier layer sidewall 408b. The first barrier layer sidewall 408a and the second barrier layer sidewall 408b form a barrier layer concavity 412, and the barrier layer concavity 412 corresponds to the display panel concavity 410. In this embodiment, one of the display panel concavity 410 and the barrier layer concavity 412 does not have a right angle. The configurations of the display panel concavity 410 and the barrier layer concavity 412 can be found in the aforementioned illustration. For example, the configuration of the display panel concavity 410 can refer to the said configuration of the frontplane concavity 332, and the configuration of the barrier layer concavity 412 can refer to the said configuration of the barrier layer concavity 336, without limitation thereto.

To sum up, the frontplane concavity and the barrier layer concavity of the display device provided in this invention can be a right angle, an obtuse angle, or an arc, but the frontplane concavity and the barrier layer concavity can not both be right angles. By this design, generation of bubbles in the sealant can be avoided while the sealant is formed.

Those skilled in the art will readily observe that numerous modifications and alterations of the device and method may be made while retaining the teachings of the invention.

What is claimed is:

1. A display device, comprising:
  a display panel comprising a backplane and a frontplane disposed on the backplane, wherein the frontplane comprises a plurality of frontplane sidewalls, and the frontplane sidewalls at least include a first frontplane sidewall and a second frontplane sidewall, wherein the first frontplane sidewall and the second frontplane sidewall form a frontplane concavity;
  a barrier layer entirely covering the frontplane, an area of the barrier layer being larger than an area of the frontplane, and the barrier layer comprising at least a first barrier layer sidewall and a second barrier layer sidewall, wherein the first barrier layer sidewall and the second barrier layer sidewall form a barrier layer concavity, the barrier layer concavity corresponds to the frontplane concavity, and at least one of the barrier layer concavity and the frontplane concavity does not include a right angle; and
  a sealant disposed in a sealant accommodating space defined by the frontplane sidewalls of the frontplane, an inner surface of the barrier layer and an inner surface of the backplane.

2. The display device of claim 1, wherein the frontplane concavity is a right angle, an obtuse angle, or an arc, and the barrier layer concavity is a right angle, an obtuse angle, or an arc.

3. The display device of claim 1, wherein the display panel further comprises:
  a pixel electrode layer disposed on the backplane;
  a spacer structure disposed on the pixel electrode layer, wherein the spacer structure defines a plurality of accommodating spaces;
  a plurality of charged particles disposed within the accommodating spaces; and
  a common electrode disposed on the spacer structure.

4. The display device of claim 3, wherein each of the accommodating spaces comprises a spherical space or a cup-shaped space.

5. The display device of claim 3, wherein the display panel further comprises at least a conductive adhesive disposed on the backplane, and the conductive adhesive is electrically connected to the common electrode.

6. The display device of claim 5, wherein the spacer structure has at least an opening, and the conductive adhesive is disposed within the opening.

7. The display device of claim 5, wherein the conductive adhesive is disposed between the spacer structure and the sealant.

8. The display device of claim 1, wherein the backplane is an active element array substrate.

9. A display device, comprising:
  a display panel comprising a backplane and a frontplane disposed on the backplane, the frontplane comprising a plurality of frontplane sidewalls, and the frontplane sidewalls at least including a first frontplane sidewall and a second frontplane sidewall, wherein the first frontplane sidewall and the second frontplane sidewall form a frontplane concavity, and an angle of a turning point of the frontplane concavity is between about 135° and about 180°.

10. The display device of claim 9, further comprising:
  a barrier layer entirely covering the frontplane, an area of the barrier layer being larger than an area of the frontplane, and the barrier layer having a first barrier layer sidewall and a second barrier layer sidewall, wherein the first barrier layer sidewall and the second barrier layer sidewall form a barrier layer concavity corresponding to the frontplane concavity; and
  a sealant disposed in a sealant accommodating space defined by the frontplane sidewalls of the frontplane, an inner surface of the barrier layer and an inner surface of the backplane.

11. The display device of claim 10, wherein an angle of a turning point of the barrier layer concavity is between about 135° and about 180°.

12. The display device of claim 10, wherein an angle of a turning point of the frontplane concavity is between about 135° and about 145°, and an angle of a turning point of the barrier layer concavity is between about 85° and about 95°.

13. The display device of claim 9, wherein the display panel further comprises:
  a pixel electrode layer disposed on the backplane;
  a spacer structure disposed on the pixel electrode layer, wherein the spacer structure defines a plurality of accommodating spaces;
  a plurality of charged particle disposed within the accommodating spaces; and
  a common electrode disposed on the spacer structure.

14. The display device of claim 13, wherein each of the accommodating spaces comprises a spherical space or a cup-shaped space.

15. The display device of claim 13, wherein the display panel further comprises at least a conductive adhesive disposed on the backplane, and the conductive adhesive is electrically connected to the common electrode.

16. The display device of claim 15, wherein the spacer structure has at least an opening, and the conductive adhesive is disposed within the opening.

17. The display device of claim 15, wherein the conductive adhesive is disposed between the spacer structure and the sealant.

18. The display device of claim 9, wherein the backplane is an active element array substrate.

19. A display device, comprising:
a display panel having a plurality of sidewalls, the sidewalls at least including a first sidewall and a second sidewall, wherein the first sidewall and the second sidewall form a display panel concavity; and
a barrier layer having a first barrier layer sidewall and a second barrier layer sidewall located on the display panel, wherein the first barrier layer sidewall and the second barrier layer sidewall form a barrier layer concavity corresponding to the display panel concavity, and one of the display panel concavity and the barrier layer concavity does not include a right angle.

20. The display device of claim 19, wherein the display panel concavity is a right angle, an obtuse angle, or an arc, and the barrier layer concavity is a right angle, an obtuse angle, or an arc.

* * * * *